United States Patent
Kapser et al.

(10) Patent No.: US 11,774,273 B2
(45) Date of Patent: Oct. 3, 2023

(54) SENSOR DEVICE, CONTROL SYSTEM AND METHOD OF COMMUNICATION BETWEEN A SENSOR DEVICE AND A CONTROL SYSTEM

(71) Applicant: Infineon Technologies AG, Neubiberg (DE)

(72) Inventors: Konrad Kapser, Graefelfing (DE); Romain Peron, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 310 days.

(21) Appl. No.: 17/102,780

(22) Filed: Nov. 24, 2020

(65) Prior Publication Data

US 2021/0164809 A1 Jun. 3, 2021

(30) Foreign Application Priority Data

Nov. 28, 2019 (DE) .......................... 102019132278.2

(51) Int. Cl.
*G01D 18/00* (2006.01)
*G01D 5/246* (2006.01)

(52) U.S. Cl.
CPC ........... *G01D 18/001* (2021.05); *G01D 5/246* (2013.01)

(58) Field of Classification Search
CPC ............................ G01D 18/001; G01D 5/246
USPC .......................................................... 702/94
See application file for complete search history.

(56) References Cited

U.S. PATENT DOCUMENTS

| | | | |
|---|---|---|---|
| 9,647,716 B2 | 5/2017 | Hammerschmidt | |
| 10,003,864 B2 | 6/2018 | Herges et al. | |
| 10,348,417 B1 | 7/2019 | Krall et al. | |
| 10,534,370 B2 | 1/2020 | Cavalcanti et al. | |
| 10,756,857 B2 | 8/2020 | Rasbornig et al. | |
| 2004/0249544 A1 | 12/2004 | Lohberg | |
| 2010/0118887 A1* | 5/2010 | Matsumoto | H04L 12/66 370/465 |
| 2015/0194992 A1* | 7/2015 | Rasbornig | H04L 69/08 375/316 |
| 2017/0059526 A1 | 3/2017 | Grambichler et al. | |
| 2019/0215095 A1 | 7/2019 | Park | |
| 2022/0063643 A1* | 3/2022 | Fujiwara | B62D 5/049 |

FOREIGN PATENT DOCUMENTS

| | | |
|---|---|---|
| CN | 1595376 A | 3/2005 |
| CN | 106463049 A | 2/2017 |
| CN | 109947073 A | 6/2019 |
| DE | 102013114355 A1 | 8/2014 |
| DE | 102014113456 A1 | 3/2016 |
| WO | 2016050558 A1 | 4/2016 |
| WO | 2018079298 A1 | 5/2018 |

* cited by examiner

*Primary Examiner* — Aditya S Bhat
(74) *Attorney, Agent, or Firm* — Harrity & Harrity, LLP

(57) ABSTRACT

Sensor device, control system and method of communication between a sensor device and a control system. Sensor devices, control systems and methods for communication between sensor devices and control systems are provided. In these, sensor data are transmitted via first interfaces and redundant sensor data and/or other data are transmitted via second interfaces.

23 Claims, 4 Drawing Sheets

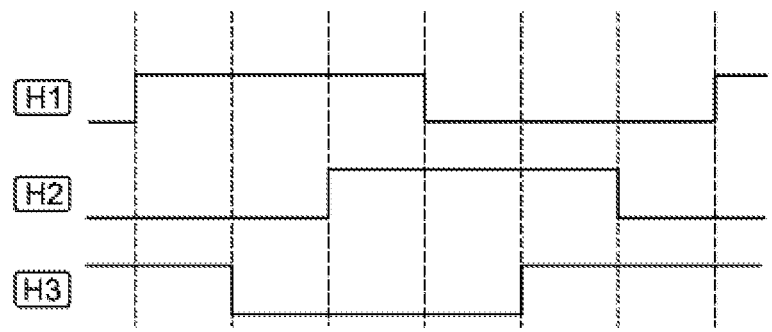
Fig. 5
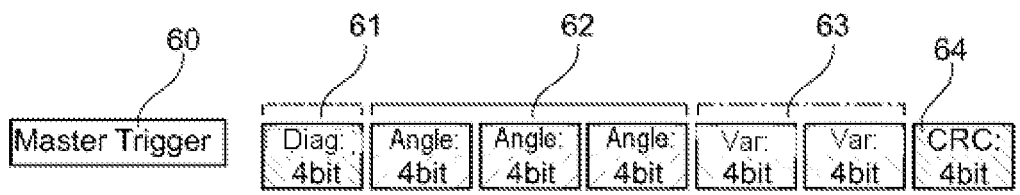
Fig. 6A
Fig. 6B

SENSOR DEVICE, CONTROL SYSTEM AND METHOD OF COMMUNICATION BETWEEN A SENSOR DEVICE AND A CONTROL SYSTEM

FIELD

This application relates generally to the communication between a sensor device and a control system, for example corresponding sensor devices, control systems and methods.

BACKGROUND

Sensor devices are generally used to detect one or more physical quantities. In some applications, signals from such control devices, which carry the measured physical quantity or quantities as information, are then transmitted to a control system. This control system can then control an associated device in accordance with the detected physical quantity or the detected physical quantities.

One example of these are electric motors, for example in vehicles. In such electric motors, in some systems, an angle sensing device can be used to detect an angular position and/or angular speed of the electric motor and transmit them to the control system. The control system then drives the electric motor depending on the angular position and/or angular speed detected, for example by supplying appropriate current to the windings of the electric motor.

Common interfaces used to transfer signals from a sensor device to a control system include an incremental interface (IIF), which is also known as an encoder interface or ABZ interface. With this interface, angle information is transmitted incrementally.

During a revolution no angular position is indicated, only a corresponding item of information in a predefined zero position is sent instead. Otherwise, the angular position is determined essentially by counting pulses or edges of the received signals, each of which indicates an incremental angular change.

Another interface used for such applications is the so-called UVW interface, also known as a "Hall Switch Mode" interface. This interface generally has a lower resolution than the IIF interface.

Both interfaces have in common that only angle information is transferred. Furthermore, the integrity of the transmission cannot be verified.

SUMMARY

A sensor device as claimed in claim 1, a control system as claimed in claim 13 and a method as claimed in claim 29 are provided. The sub-claims define further embodiments.

According to one exemplary embodiment, a sensor device is provided, including:
a first interface, wherein the sensor device is configured to transmit sensor data via the first interface, and
a second interface, wherein the sensor device is configured to transmit redundant sensor data and/or additional data via the second interface.

According to another exemplary embodiment, a control system is provided, including:
a first interface for receiving sensor data from a sensor device, and
a second interface for receiving redundant sensor data and/or additional data from the sensor device.

According to another exemplary embodiment, a method of communication between a sensor device and a control system is provided, including:
transmitting sensor data from the sensor device to the control system via respective first interfaces of the sensor device and the control system, and
transmitting redundant sensor data and/or other data from the sensor device to the control system via a respective second interface of the sensor device and the control system.

The above brief summary is only intended as a short overview of some exemplary embodiments and is not to be interpreted as limiting.

BRIEF DESCRIPTION OF THE DRAWINGS

FIG. 5 shows a data transmission via a UVW interface.

FIG. 6A shows a data transmission via an SPC-based interface.

FIG. 6B shows examples of the data transmission of FIG. 6A for various master-trigger signals.

DETAILED DESCRIPTION

In the following, various exemplary embodiments are explained in detail. These exemplary embodiments are intended for illustration purposes only and should not be construed as limiting. For example, in other exemplary embodiments, some of the features represented (e.g. elements or components) may be omitted or replaced by alternative features. In addition to the features explicitly described, other features can also be provided. For example, the following examples refer mainly to the communication between a sensor device and a control system. Other parts of sensor devices and control systems can be implemented in a conventional way and are therefore not explained in detail.

Connections or couplings between different components or elements refer to electrical connections or couplings, unless otherwise specified. Such connections or couplings can be modified, for example by adding elements or by omitting elements, provided the basic function of the connection or coupling, for example the transmission of a signal, the transmission of information, the provision of a voltage or a current and the like, is essentially preserved.

Features of different exemplary embodiments can be combined to form additional exemplary embodiments. Variations, additional features or details of features described for one of the exemplary embodiments can also be applied to other exemplary embodiments and are therefore not explained twice.

Figure 1:
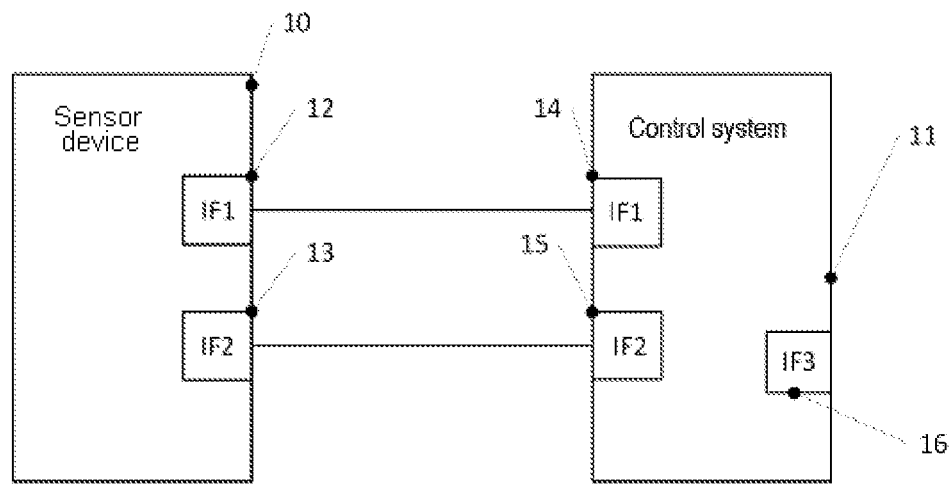
FIG. 1 shows a block diagram of a system according to one exemplary embodiment.

FIG. 1 shows a block diagram of a system according to one exemplary embodiment. The system of FIG. 1 has a sensor device 10 and a control system 11. A sensor device is generally understood to be a device which comprises one or more sensors in order to detect one or more physical quantities. For example, the sensor device 10 can be designed as an angle sensor device to detect a rotation angle or an angular speed of a rotary element, such as a shaft. For this purpose, the sensor device may have, for example, one or more magnetic field sensors such as Hall sensors, or sensors based on magnetoresistive effects (xMR sensors). A magnet device can then be attached to a rotating element, which under rotation generates a modulated magnetic field that is detected by the magnetic field sensor or the magnetic field sensors. In other embodiments, a linear motion can be detected in a similar way by attaching a magnet device to a linearly moving element. Additionally, or alternatively, the sensor device 10 may comprise other types of sensors such as voltage sensors, current sensors, temperature sensors, pressure sensors and the like. There may also be different types of sensors present in the sensor device 10. In cases where the sensor device 10 acts as an angle sensor device, for example, a temperature sensor may also be provided. These sensors can be implemented in any conventional manner.

In addition, the sensor device 10 can comprise a processing circuit for processing signals from the sensor or sensors. Such processing circuits can be, for example, filters, analog-to-digital converters and the like. Such processing circuits can also be implemented in any conventional manner and therefore will not be explained in detail.

The sensor device 10 also has a first interface 12 and a second interface 13. The sensor device 10 is configured to send sensor data via the first interface 12. Sensor data here refers to data that is representative of the physical quantities detected by the sensor or the sensors, possibly processed by the processing circuit mentioned above. The first interface 12 can have a high resolution and/or data rate compared to the second interface 13 discussed below, in order to transmit the sensor data with high temporal resolution. In the case of angle sensors, for example, the first interface 12 can be an IIF interface or a UVW interface as mentioned above. Such interfaces are explained in more detail below. For example, the IIF interface typically has a resolution of 12 bits, corresponding to 4096 pulses per revolution. For other types of sensors, other relevant interfaces, which are conventionally used to transmit sensor data for corresponding sensors, can be used as the first interface 12.

In some exemplary embodiments, the second interface 13 has a lower data rate than the first interface. In some exemplary embodiments, the second interface 13 is a single-wire interface that requires only a single conductor, in contrast to the IIF or UVW interfaces mentioned above, which usually work with three wires. The second interface 13 can be a digital interface. The second interface can be an interface which allows the integrity of the transmitted data to be verified, for example with a checksum such as a CRC (Cyclic Redundancy Check). Verifying the integrity of the data means that errors in the data caused by the transmission (e.g. due to noise) can be detected and, in some implementations, even corrected. Data items such as checksums, which enable the integrity of transmitted data to be verified, are referred to in the context of this application as integrity information.

In some exemplary embodiments, the sensor device 10 is configured to send redundant sensor data via the second interface 13, in other words sensor data that provide redundant information about the sensor data sent via the first interface 12. This can contribute to satisfying security requirements. In some exemplary embodiments, the second interface 13 can also be used to transmit diagnostic data or additional sensor data from other sensors, such as the above-mentioned temperature sensor in an angle sensor device.

In some exemplary embodiments, this transmission can be carried out at the request of the control system 11. In this case, the sensor device 10 receives a request to send certain data via the second interface 13 and sends this data in response to the request. In such an approach, in the case of redundant sensor data the request can be used to specify the time of transmission of the redundant sensor data, which facilitates a comparison of the sensor data sent via the first interface 12 with the sensor data sent via the second interface 13.

In some exemplary embodiments, the second interface 13 may comprise an edge-based pulse-width modulated protocol, in particular a bidirectional protocol. Such protocols use pulse-width modulated pulses, wherein edges of the pulses are detected and the pulse width of the pulses depends on the data to be sent. An example of such a protocol is the SPC protocol (Short PWM Code Protocol). The SPC protocol is based on the SENT protocol (Single Edge Nibble Transmission).

Examples of the variants for the second interface described above are explained in more detail below.

The sensor device 11 also has a first interface 14 and a second interface 15. The first interface 14 is connected to the first interface 12 and designed identically to the first interface 12. This means that the first interface 14 is configured to receive data from the first interface 12, so that communication is enabled via the first interfaces 12 and 14. The second interface 15 is connected to the second interface 13 and is designed identically to the second interface 13, in order to enable a corresponding communication here also. The above descriptions of the first interface 12 and the second interface 13 of the sensor device 10 also apply correspondingly to the first interface 14 and the second interface 15 of the control system 11.

Apart from providing the two interfaces 14, 15, the control system can be implemented in a conventional manner, for example by means of a microcontroller, an electronic control unit (ECU), for example in a vehicle, by means of a multi-purpose processor (GPU; General Processing Unit), by means of an application-specific integrated circuit (ASIC), and the like.

The control system 11 receives sensor data from the 10 sensor device via the first interface 14 and receives redundant data and/or other data, such as diagnostic data or other sensor data, from the sensor device 10 via the second interface 15. In addition, in some exemplary embodiments the control system 11 can send the above-mentioned requests to the sensor device 10. In some exemplary embodiments, control and/or configuration information can also be sent from the control system 11 to the sensor device 10 via the second interface.

Depending on the sensor data received, the control system 11 can control another device (not shown in FIG. 1) via a third interface 16. For example, in the case of an angle sensor device 10, an angle of rotation of an electric motor can be detected, and the control system 11 can then control the electric motor accordingly via the third interface 16.

Figure 2:
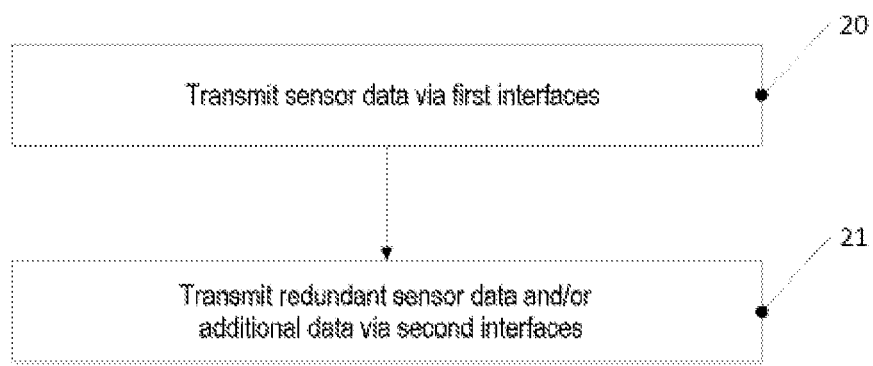
FIG. 2 shows a flowchart illustrating a method in accordance with various exemplary embodiments.

FIG. 2 shows a flow chart illustrating methods in accordance with several exemplary embodiments. The method of FIG. 2, for example, can be used in the system of FIG. 1 or systems described in more detail hereafter. To avoid repetition, the method of FIG. 2 will be explained by referring to the above explanations for FIG. 1.

At 20, the method comprises transmitting sensor data between a sensor device and a control system via the respective first interfaces, for example the first interfaces 12 and 14 of FIG. 1. The different variants that were explained for this by referring to FIG. 1 also apply in a corresponding way to the transmission in 20 of FIG. 2, for example, the possible implementations of the first interfaces.

At 21, the method comprises transmitting redundant sensor data and/or additional data between the sensor device and the control system via second interfaces, for example the second interfaces 13 and 15 of FIG. 1. The different variants for this purpose discussed by referring to FIG. 1 apply in a corresponding way to the transmission in 21 of FIG. 2. It should be noted that the transmission at 20 and the transmission at 21 can take place essentially simultaneously, that is, via the first and second interfaces in parallel, so that the sequence shown in FIG. 2 is not to be interpreted as limiting.

In the following, various possible details for such a transmission by means of a first interface and a second interface will now be described in more detail, referring to FIGS. 2-6. These details and variants can be applied to the system of FIG. 1 and the method of FIG. 2 accordingly and also combined with each other.

Figure 3:
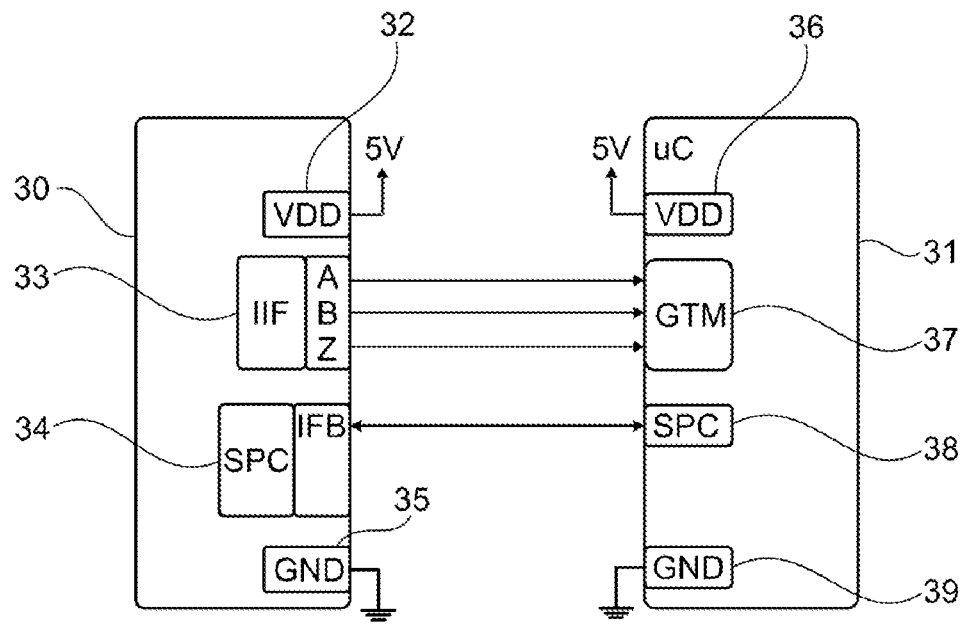
FIG. 3 shows a block diagram of a system according to one exemplary embodiment.

FIG. 3 shows a system in accordance with another exemplary embodiment. The system of FIG. 3 comprises a sensor device 30 and a control system 31. The control system 31 is designed as a microcontroller. Unless otherwise specified in the following description of FIG. 3, the description of the sensor device 10 of FIG. 1 and the control system 11 of FIG. 1 is also applicable to the sensor device 30 of FIG. 3 or the control system 31 of FIG. 3. For example, as described for the sensor device 10, the sensor device 30 may comprise one or more sensors and, where appropriate, a processing circuit, and the control system 31 may be used to control a further device based on signals from the sensor device 32.

The sensor device 30 in the exemplary embodiment of FIG. 3 is supplied with a positive supply voltage, for example 5 V, which is coupled with a corresponding supply voltage terminal 32. In addition, the sensor device 30 is connected to ground at a ground connection 35.

Similarly, the control system 31 is also supplied with a positive supply voltage, such as 5 V, at a supply voltage terminal 36 and is connected to ground at a ground connection 39.

The sensor device 30 in the exemplary embodiment of FIG. 3 is an angle sensor device that measures an angle of rotation or angular speed of a rotary element, which as the first interface has an IIF interface with terminals labeled A, B, and Z, as is standard for IIF interfaces. Signals from the IIF interface 33 are received by the control system 31 at an interface 37. This can be formed, for example, by a generic timer module (GTM), as is found in various conventional microcontrollers.

As the second interface, the sensor device 30 has an SPC-based interface 34, which communicates with a corresponding SPC interface 38 of the control system 31 by means of a terminal, e.g. pins, labeled IFB via a single line.

Examples of the communication via the IIF interface 33 (or the corresponding interface 37 of the control system 31) and via the SPC-based interfaces 34, 38 will now be described with reference to FIGS. 4 to 6.

Figure 4:
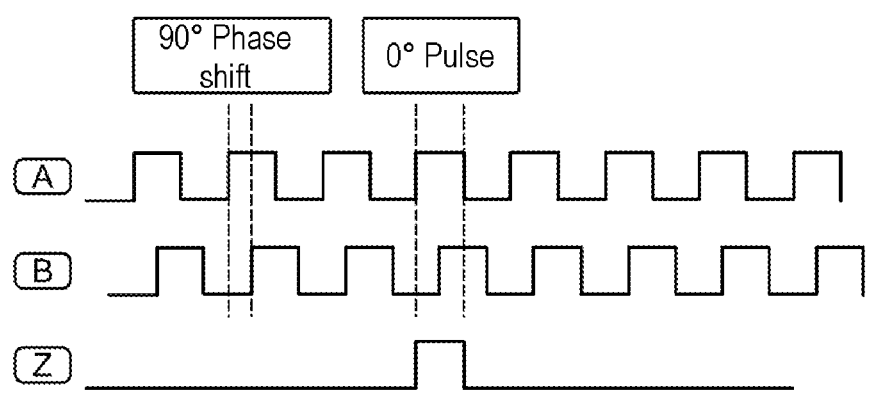
FIG. 4 shows a data transmission via an IIF interface.

FIG. 4 shows an example of a communication via the IIF interface. Here, two signals phase-offset by 90° are output on the terminals labeled A and B, and the direction of the phase difference between these signals indicates the direction of rotation of the rotary element (+90° for a clockwise rotation and −90° for a counter-clockwise rotation). The frequency of the pulses is proportional to the angular speed of the rotating element. For example, the frequency of the pulses can correspond to a frequency of zero-crossings measured by a magnetic field sensor when a magnet device is used which is attached to a shaft or other rotating element, such as a pole wheel or a toothed wheel. A pulse is output at the terminal labeled Z when the rotary element is in a predefined 0° position. The drawing in FIG. 4 corresponds to the conventional communication via an IIF interface of this kind and will therefore not be explained in more detail. This enables the transmission of the angle information with a high data rate, wherein between individual 0° pulses the angular position is determined by means of appropriate integration over the pulses, since each pulse corresponds to a certain incremental angle of rotation.

A UVW interface with three lines H1, H2 and H3 can also be used as an alternative to the IIF interface. In this case, three phase-shifted pulses are used, also in a conventional manner, to transmit the angle information acquired by the sensor device. The data rate is generally lower than with the IIF interface.

Next, an example of communication via the SPC interfaces 34, 38 of FIG. 3 will be explained. FIG. 6A shows a general frame format of a communication, and FIG. 6B then shows examples of this.

In the case of an SPC interface, the communication is triggered by a master trigger pulse 60, as is standard in SPC communication. In the case of FIG. 3 this is sent from the control system 31 to the sensor device 30 and is a pulse of a specific length, wherein, as explained below, a plurality of different lengths are possible. The sensor device responds to this master trigger pulse 60 with a response, which in the example of FIG. 6a consists of a total of seven 4-bit values. Each 4-bit value is encoded in a pulse (also called a "nibble"). A time between two edges of successive pulses determines the bit value, i.e. here there are $2^4=16$ different possible intervals. It should be noted that the number of seven values, each of which encodes 4 bits, may be chosen differently in other edge-based pulse-width modulation protocols.

In a first exemplary embodiment, the first 4 bits (reference sign 61) are diagnostic bits which can represent 16 different values that are sent to each data frame. These can comprise, for example, a sensor fault, a power-up fault, a sensor device reset, or the like. They can also comprise a counter, or they can also transmit additional values such as a temperature value, distributed across multiple data frames, for example, or with a resolution of 4 bits.

The next three 4-bit values, labeled with reference sign 62, are used to transmit angle information, which is an example of redundant sensor data. The next two 4-bit values, labeled with reference sign 63, can be used in variable ways, as will be explained by reference to FIG. 6B. The last 4-bit value 64 contains a CRC checksum. This CRC checksum allows the control system 31 to verify the integrity of the received data.

The angle information, which is encoded in the 4-bit values 62, can be in particular absolute angle information, in contrast to the incremental information in which a 0° position is indicated only once per revolution, as is used with the IIF interface (see FIG. 3).

Such absolute angle information can be provided, for example, by integration directly in the sensor device.

The master trigger pulse 60 can be used to select different types of data for transmission in the variably used 4-bit values 63. This will be explained by reference to FIG. 6B.

Different lengths of trigger pulses are used to request different responses from the sensor device 30. Conventionally, in the SPC protocol these different master trigger pulse lengths are used in the so-called bus mode in order to address different bus nodes, for example different sensor devices connected to a common bus. In this case, they represent an addressing of different bus nodes. In the exemplary embodiment of FIG. 6b, different master trigger pulse lengths are used instead to request different responses from the sensor device. To illustrate this, three examples of responses to different master trigger pulses are shown, labeled as Mastertrigger #1, Mastertrigger #2, and Mastertrigger #3. The 4-bit values 61, 62 and 64 are the same in all cases, with the 4-bit values used for the angle information 62 in the example of FIG. 6B being used to transmit an absolute angle.

The variably usable 4-bit values 63 are used in response to the master trigger pulse Mastertrigger #1 to transmit an 8-bit temperature information item obtained from a temperature sensor of the sensor device. If a temperature is also transmitted with the diagnostic bits (4-bit value 61), then a temperature transmission with a higher resolution is possible.

In the case of the master trigger pulse Mastertrigger #2, the variable-use bits 63 are used for extended diagnostic information. Such extended diagnostic information can include, for example, plausibility data, data on various components of the sensor device, such as an analog-to-digital converter, EEPROM, UV/OV or EEPROM information. For example, the extended diagnostic information can indicate the component in which a fault has occurred, and/or a cause of the fault.

In the third master trigger pulse Mastertrigger #3, the variable 4-bit values 63 are omitted, and the CRC checksum is directly appended to the 4-bit values 62 used for the angle information.

Thus, a selection can be made between different information by a control system using different master trigger pulses.

In all of the options shown in FIGS. 6A and 6B, redundant sensor data, in this case angle information, is sent in response to a trigger pulse. In this way, by way of the trigger pulse the control system can also define a time for the redundant sensor data, since in the case of the SPC protocol, for example, these data are essentially sent immediately after the trigger pulse. This makes it easier in some exemplary embodiments to compare the redundant sensor data with the sensor data received via the first interface in the control system (e.g. control system 31). In particular, sensor data and redundant sensor data can be compared for the same point in time. In particular, with digital interfaces such as the SPC interface, such a use of trigger pulses thus allows a temporal coordination with the first interface, in this case the IIF interface.

In other exemplary embodiments, a SENT interface (Single Edge Nibble Transmission) can also be used, wherein the above described trigger function is not provided here, but a transmission with a checksum, in particular a CRC checksum, of redundant data is nevertheless possible.

During transmission, for example, the redundant sensor data can also be used for a "calibration" of the sensor data received via the first interface, for example in some exemplary embodiments involving during a slow motion. Thus, using the absolute angle information from the redundant sensor data of FIG. 6B a new starting point for the integration can be set based on the pulses without having to wait for the next 0° pulse, for example, on the "Z" line of FIG. 4.

Figure 7:
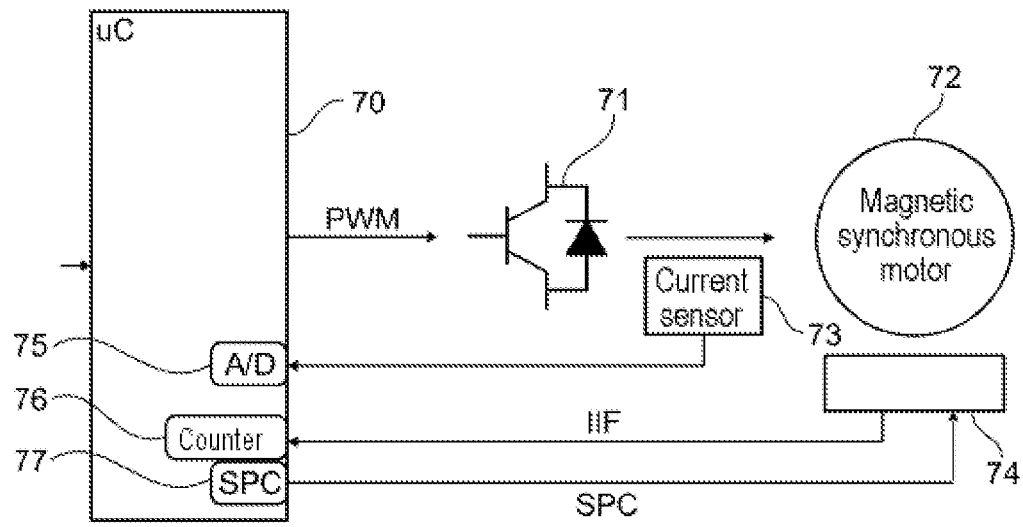
FIG. 7 shows a block diagram of a system according to one exemplary embodiment.

As mentioned above, control systems and sensor devices can be used, for example, to control electric motors as explained above. Such an application example is shown in FIG. 7. However, this should not be interpreted as limiting, and sensor devices as described here may also be used for other applications.

The system of FIG. 7 comprises a control system 70, a driver circuit 71, a magnet-based synchronous motor 72, a current sensor 73 and a sensor device 74. The sensor device 74 is designed as an angle sensor device and can be implemented in the same way as the sensor device 30 of FIG. 3. In particular, it can transmit sensor data via an IIF interface and other data via an SPC interface. The control system 70 is implemented as a microcontroller and can communicate with the sensor device 74 by means of an interface 76, which corresponds to the interface 37 of FIG. 3, and via an SPC interface 77, which corresponds to the interface 38 of FIG. 3, as explained above. Furthermore, the control system 70 has an analog-to-digital converter input 75, via which it receives a current measured by the current sensor 73.

The sensor device 74 is used to measure a rotation angle of the motor 72. The synchronous motor 72 is supplied with a current (for example, in three current phases) via the driver circuit 71, which is detected via the current sensor 73. Based on the detected current and the angle of rotation detected by the sensor device 74, the control system 70 controls the driver circuit 71 with a pulse-width modulated signal PWM to control the motor 72. This control can be carried out in any known manner. By providing, for example, redundant sensor data via the SPC interfaces, safety can be increased as described.

Some exemplary embodiments are defined by the following examples:

Example 1. Sensor device, comprising:
a first interface, wherein the sensor device is configured to transmit sensor data via the first interface, and
a second interface, wherein the sensor device is configured to transmit redundant sensor data and/or additional data via the second interface.

Example 2. The sensor device according to example 1, wherein the second interface is a single-wire interface.

Example 3. The sensor device according to example 1 or 2, wherein the sensor device is configured to communicate via the second interface on the basis of an edge-based pulse-width modulation protocol.

Example 4. The sensor device according to example 3, wherein the edge-based pulse-width modulation protocol is based on the short pulse width modulation code, SPC, protocol.

Example 5. The sensor device according to any one of examples 1 to 4, wherein the sensor device is configured to receive a request via the second interface and to send the redundant sensor data and/or the additional data in response to the request.

Example 6. The sensor device according to example 5, wherein the request specifies which data of the redundant sensor data and/or the additional data are sent.

Example 7. The sensor device according to example 6, wherein the redundant sensor data are always sent and wherein the request selects a type of the additional data.

Example 8. The sensor device according to any one of examples 1 to 7, wherein the sensor device comprises an angle sensor device, wherein the sensor data indicate an incremental angular position and the redundant sensor data indicate an absolute angular position.

Example 9. The sensor device according to any one of examples 1 to 8, wherein the first interface comprises an incremental interface, IIF, or a UVW interface.

Example 10. The sensor device according to any one of examples 1 to 9, wherein the sensor device is configured to transmit the redundant sensor data and/or the additional data together with integrity information via the second interface.

Example 11. The sensor device according to example 10, wherein the integrity information comprises a CRC checksum.

Example 12. The sensor device according to any one of examples 1 to 11, wherein the additional data comprise diagnostic data and/or additional sensor data from a different sensor than the sensor data.

Example 13. A control system, comprising:
a first interface for receiving sensor data from a sensor device, and
a second interface for receiving redundant sensor data and/or additional data from the sensor device.

Example 14. The control system according to example 13, wherein the second interface is a single-wire interface.

Example 15. The control system according to example 13 or 14, where the control system is configured to communicate via the second interface based on an edge-based pulse-width modulation protocol.

Example 16. The control system according to example 15, wherein the edge-based pulse-width modulation protocol is based on the short pulse width modulation code, SPC, protocol.

Example 17. The control system according to any one of examples 12 to 16, wherein the control system is configured to receive a request via the second interface and to send the redundant sensor data and/or the additional data in response to the request.

Example 18. The control system according to example 17, wherein the request specifies which data of the redundant sensor data and/or the additional data are to be sent by the sensor device.

Example 19. The control system according to example 18, wherein the redundant sensor data must always be sent, and the request selects a type of the additional data.

Example 20. The control system according to any one of examples 12 to 19, wherein the first interface comprises an interface for receiving data from an incremental interface, IIF, or a UVW interface.

Example 21. The control system according to any one of examples 12 to 20, wherein the control system is configured to receive the redundant sensor data and/or the additional data together with integrity information via the second interface and to check the integrity of the redundant sensor data and/or the additional data based on the integrity information.

Example 22. The control system according to example 21, wherein the integrity information comprises a CRC checksum.

Example 23. The control system according to any one of examples 12 to 22, wherein the additional data comprise diagnostic data and/or additional sensor data from a different sensor than the sensor data.

Example 24. The control system according to any one of examples 12 to 23, wherein the control system is configured to compare the sensor data and the redundant sensor data and/or to calibrate the sensor data based on the redundant sensor data.

Example 25. The control system according to any one of examples 12 to 24, wherein the control system is configured to control a further device based on the sensor data.

Example 26. A method for communicating between a sensor device and a control system, comprising:
transmitting sensor data from the sensor device to the control system via respective first interfaces of the sensor device and the control system, and
transmitting redundant sensor data and/or additional data from the sensor device to the control system via a respective second interface of the sensor device and the control system.

Example 27. The method according to example 26, wherein the second interface is a single-wire interface.

Example 28. The method according to example 26 or 27, wherein the transmission of the redundant sensor data and/or the additional data is based on an edge-based pulse-width modulation protocol.

Example 29. The method according to example 28, wherein the edge-based pulse-width modulation protocol is based on the short pulse width modulation code, SPC, protocol.

Example 30. The method according to any one of examples 26 to 29, further comprising sending a request from the control system to the sensor device, wherein the transmission of the redundant sensor data and/or of the additional data takes place in response to the request.

Example 31. The method according to example 30, wherein the request specifies which data of the redundant sensor data and/or the additional data are transmitted.

Example 32. The method according to example 31, wherein the redundant sensor data are always transmitted and wherein the request selects a type of the additional data.

Example 33. The method according to any one of examples 26 to 32, wherein the redundant sensor data and/or the additional data are transmitted together with integrity information.

Example 34. The method according to example 33, wherein the integrity information comprises a CRC checksum.

Example 35. The method according to any one of examples 26 to 34, further comprising using the control system to compare the sensor data and the redundant sensor data and/or to calibrate the sensor data based on the redundant sensor data.

Although specific exemplary embodiments have been illustrated and described in this description, persons with current knowledge of the art will recognize that a plurality of alternative and/or equivalent implementations can be chosen as a substitute for the specific exemplary embodiments shown and described in this description, without deviating from the scope of the invention disclosed. It is the intention that this application covers all adaptations or variations of the specific exemplary embodiments discussed here. It is therefore intended that this disclosure is limited only by the claims and their equivalents.

What is claimed is:
1. A sensor device, comprising:
at least one processor;
a first interface, wherein the at least one processor is configured to transmit sensor data via the first interface; and
a second interface, wherein the at least one processor is configured to transmit at least one of redundant sensor data or additional data via the second interface,
wherein the at least one processor is configured to receive a request via the second interface and to transmit the at least one of the redundant sensor data or the additional data in response to the request,
wherein the at least one processor is configured to always transmit the redundant sensor data in response to receiving the request and, if the request identifies a type of additional data, the at least one processor is configured to transmit the additional data based on the type of additional data identified in the request, wherein the sensor device comprises an angle sensor device, wherein the sensor data indicates an incremental angular position, and wherein the redundant sensor data indicates an absolute angular position.

2. The sensor device as claimed in claim 1, wherein the second interface is a single-wire interface.

3. The sensor device as claimed in claim 1, wherein the at least one processor is configured to communicate via the second interface based on an edge-based pulse-width modulation protocol.

4. The sensor device as claimed in claim 3, wherein the edge-based pulse-width modulation protocol is based on a short pulse width modulation code (SPC) protocol.

5. The sensor device as claimed in claim 1, wherein the at least one processor is configured to transmit the redundant sensor data and the additional data via the second interface in response to receiving the request, and wherein the request identifies a type of additional data and the at least one processor is configured to transmit the additional data based on the type of additional data identified in the request.

6. A control system, comprising:

at least one processor;

a first interface configured to receive sensor data from an angle sensor device, wherein the sensor data indicates an incremental angular position; and a second interface configured to receive redundant sensor data and additional data from the angle sensor device, wherein the redundant sensor data indicates an absolute angular position, wherein the at least one processor is configured to receive the sensor data and the redundant sensor data, and compare the sensor data and the redundant sensor data to detect an error corresponding to the sensor data and the redundant sensor data or to calibrate the sensor data based on the redundant sensor data.

7. The control system as claimed in claim 6, wherein the second interface is a single-wire interface.

8. The control system as claimed in claim 6, wherein the control system is configured to communicate via the second interface based on an edge-based pulse-width modulation protocol.

9. The control system as claimed in claim 8, wherein the edge-based pulse-width modulation protocol is based on a short pulse width modulation code (SPC) protocol.

10. The control system as claimed in claim 6, wherein the at least one processor is configured to transmit a plurality of requests via the second interface and to receive at least one of the redundant sensor data or the additional data in response to each request of the plurality of requests.

11. The control system as claimed in claim 10, wherein each request of the plurality of requests specifies which data of the at least one of the redundant sensor data or the additional data is to be transmitted by the angle sensor device.

12. The control system as claimed in claim 10, wherein the redundant sensor data must always be transmitted by the angle sensor device for each request of the plurality of requests transmitted by the at least one processor, and each request of the plurality of requests selects a type of the additional data to be transmitted by the angle sensor device.

13. The control system as claimed in claim 11, wherein the at least one processor is configured to transmit a first request via the second interface and receive the redundant sensor data in response to the first request, and transmit a second request via the second interface and receive the additional data in response to the second request, and wherein the first request and the second request specify which data of the redundant sensor data or the additional data is received, and the at least one processor is configured receive at least one of the redundant sensor data or the additional data via the second interface based on which data of the at least one of the redundant sensor data or the additional data is specified in the first request and the second request.

14. A method for communicating between an angle sensor device and a control system, the method comprising:

transmitting sensor data from the angle sensor device to the control system via a first interface of the angle sensor device and the control system, wherein the sensor data indicates an incremental angular position corresponding to a rotatable object, and transmitting of redundant sensor data and additional data from the angle sensor device to the control system via a second interface of the angle sensor device and the control system, wherein the redundant sensor data indicates an absolute angular position corresponding to the rotatable object.

15. The method as claimed in claim 14, wherein the second interface is a single-wire interface.

16. The method as claimed in claim 14, wherein a transmission of the at least one of the redundant sensor data or the additional data is based on an edge-based pulse-width modulation protocol.

17. The method as claimed in claim 16, wherein the edge-based pulse-width modulation protocol is based on a short pulse width modulation code (SPC) protocol.

18. The method as claimed in claim 14, further comprising:

sending a plurality of requests from the control system to the angle sensor device, wherein a transmission of at least one of the redundant sensor data or the additional data takes place in response to each request of the plurality of requests.

19. The method as claimed in claim 18, wherein each request of the plurality of requests specifies which data of the at least one of the redundant sensor data or the additional data is transmitted.

20. The method as claimed in claim 18, wherein the redundant sensor data is always transmitted in response to each request of the plurality of requests, wherein each request of the plurality of requests further identifies a type of the additional data for transmission from the angle sensor device to the control system, and wherein the additional data is transmitted by the angle sensor device based on the type of additional data identified in each request of the plurality of requests.

21. The method as claimed in claim 19, wherein sending the plurality of requests from the control system to the angle sensor device comprises:

sending a first request via the second interface; and sending a second request via the second interface, wherein the redundant sensor data is transmitted from the angle sensor device in response to the first request, and wherein the additional data is transmitted from the angle sensor device in response to the second request.

22. The method as claimed in claim 14, further comprising:

comparing, by the control system, the sensor data and the redundant sensor data; or calibrating, by the control system, the sensor data based on the redundant sensor data.

23. A sensor device, comprising:
- at least one processor;
- a first interface, wherein the at least one processor is configured to transmit sensor data via the first interface; and
- a second interface, wherein the at least one processor is configured to transmit at least one of redundant sensor data or additional data via the second interface,
- wherein the at least one processor is configured to receive a first request via the second interface and transmit the redundant sensor data in response to the first request, and receive a second request via the second interface and transmit the additional data in response to the second request,
- wherein the first request and the second request specify which data of the redundant sensor data or the additional data is transmitted, and the at least one processor is configured transmit at least one of the redundant sensor data or the additional data via the second interface based on which data of the at least one of the redundant sensor data or the additional data is specified in the first request and the second request,
- wherein the sensor device comprises an angle sensor device,
- wherein the sensor data indicates an incremental angular position, and
- wherein the redundant sensor data indicates an absolute angular position.

* * * * *